Patented June 25, 1935

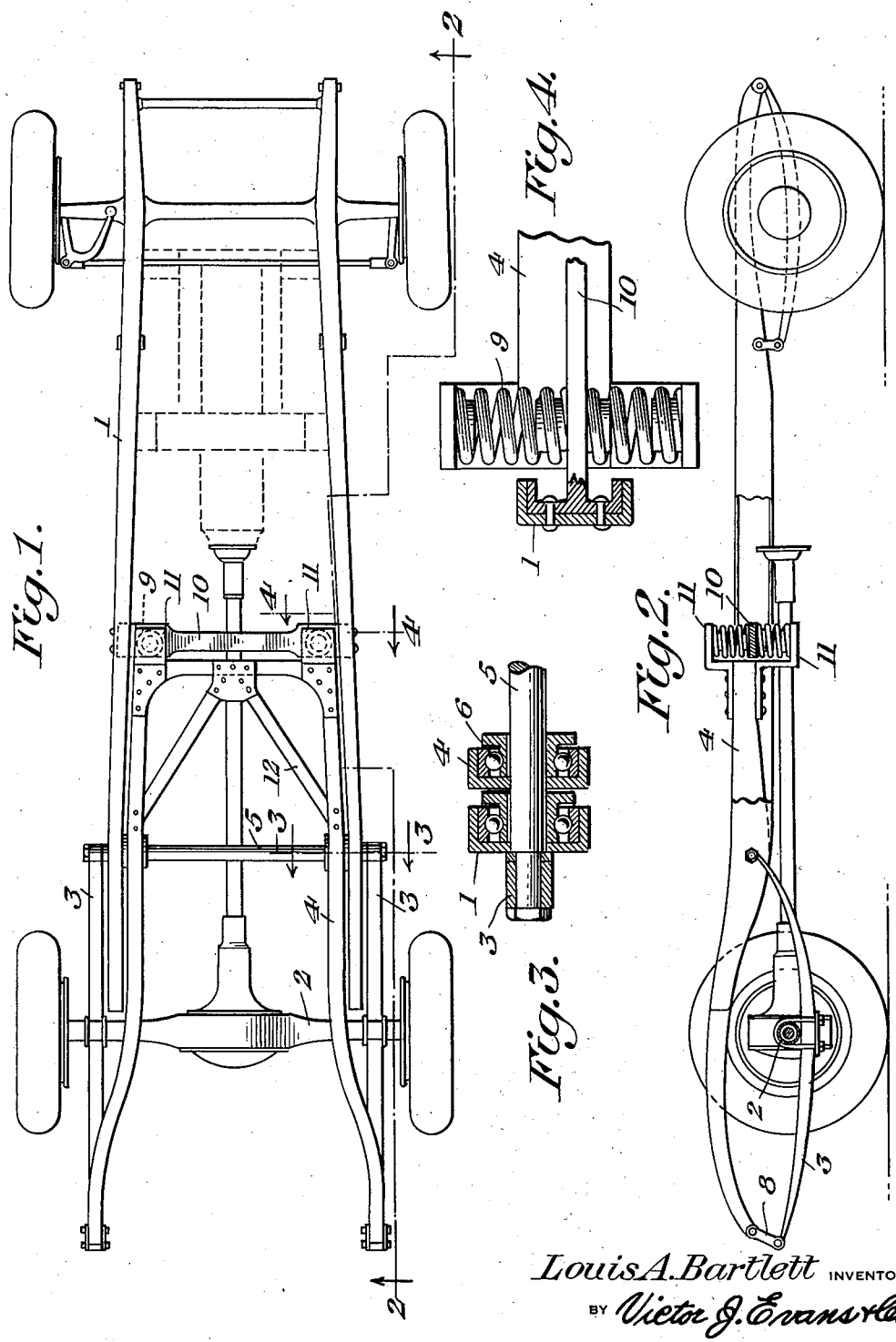

2,005,838

UNITED STATES PATENT OFFICE 2,005,838

SHOCK ABSORBER FOR MOTOR VEHICLES

Louis A. Bartlett, Pittsburgh, Pa.

Application March 28, 1934, Serial No. 717,819

3 Claims. (Cl. 280—106.5)

This invention relates to shock absorbers for motor vehicles and has for the primary object the provision of a device of the above stated character for increasing the safety and riding qualities of the rear of a motor vehicle by eliminating side sway to the vehicle and the absorption of road shocks and jars due to the rear wheel striking uneven places in the roadway and further providing to the vehicle a better balance between the front and rear end thereof.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a motor vehicle chassis with my invention applied thereto.

Figure 2 is a sectional view taken on the line 2—2 of Figure 1.

Figure 3 is a transverse sectional view taken on the line 3—3 of Figure 1.

Figure 4 is a similar view taken on the line 4—4 of Figure 1.

Referring in detail to the drawing, the numeral 1 indicates a motor vehicle chassis, the rear axle assembly being indicated by the character 2 and equipped with the usual springs 3. It is to be noted that the rear axle assembly is arranged rearwardly of the rear end of the chassis 1 and that my invention is employed between the chassis and the springs 3 and consists of an auxiliary frame 4 journaled on a shaft 5 arranged transversely of the chassis 1 adjacent to the rear end of the latter. Anti-friction bearings 6 are provided between the shaft 5 and the chassis 1 and auxiliary frame 4 and the ends of said shaft provide hangers for the front ends of the springs 3. The auxiliary frame 4 extends forwardly and rearwardly of the shaft 5 and also rearwardly of the rear end of the chassis 1 and the rear ends of the side portions of said auxiliary frame form hangers for the rear shackles 8 of the springs 3. The shaft 5 forms a fulcrum for the auxiliary frame 4 to swing on during the up and down motion of the rear axle assembly and the forward end of the auxiliary frame is yieldably supported by shock absorbing springs 9 arranged above and below a cross member 10 secured to the chassis 1. The springs 9 seat upon the cross member 10 and also against brackets 11 carried by the forward end of the auxiliary frame. This end of said auxiliary frame is reinforced by braces 12.

The forward end of the auxiliary frame moves in an opposite direction to the rear end of said auxiliary frame and this movement is cushioned by the springs 9. The rocking motion of the auxiliary frame on the shaft 5 is due to the rear wheels passing over uneven places in the roadway and to prevent the rear wheel assembly from imparting the road shocks to the main frame or chassis 1 the springs 9 are employed and absorb said road shocks consequently providing more efficient riding qualities to the vehicle and eliminates side sway and provides a better balanced chassis and thereby adds safety to the vehicle especially at high speeds.

Having described the invention, I claim:

1. In combination with a motor vehicle chassis having a rear axle assembly arranged rearwardly of the rear end of said chassis and including rear springs, a shaft journaled to the chassis forward of the rear end thereof and providing hangers for the front ends of said springs, an auxiliary frame journaled to said shaft and connected to the rear ends of said springs, cushion means between said auxiliary frame and the chassis, and anti-friction bearings provided between the shaft and the chassis and the auxiliary frame.

2. In combination with a motor vehicle chassis having a rear axle assembly arranged rearwardly of the rear end of said chassis and including rear springs, a shaft journaled to the chassis forward of the rear end thereof and provided hangers for the front ends of said springs, an auxiliary frame journaled to said shaft and connected to the rear ends of said springs, a cross member secured to the chassis, brackets secured to the forward end of the auxiliary frame and arranged above and below the cross member and coil springs interposed between said brackets and cross member.

3. In combination with a motor vehicle chassis having a rear axle assembly arranged rearwardly of the rear end of said chassis and including rear springs, a shaft journaled to the chassis forward of the rear end thereof and providing hangers for the front ends of said springs, an auxiliary frame journaled to said shaft and connected to the rear ends of said springs, a cross member secured to the chassis, brackets secured to the forward end of the auxiliary frame and arranged above and below the cross member, and coil springs interposed between said brackets and cross member, and braces for the forward end of the auxiliary frame and arranged forwardly of said shaft.

LOUIS A. BARTLETT.